(12) United States Patent
Diehl

(10) Patent No.: US 12,373,532 B2
(45) Date of Patent: Jul. 29, 2025

(54) VISUAL ENROLLMENT OF CAMERAS

(71) Applicants: Sony Group Corporation, Tokyo (JP); Sony Pictures Entertainment Inc., Culver City, CA (US)

(72) Inventor: Eric Diehl, Culver City, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 18/123,180

(22) Filed: Mar. 17, 2023

(65) Prior Publication Data

US 2023/0231726 A1    Jul. 20, 2023

Related U.S. Application Data

(62) Division of application No. 16/859,449, filed on Apr. 27, 2020, now Pat. No. 11,625,470.

(51) Int. Cl.

| | |
|---|---|
| G06F 21/33 | (2013.01) |
| G06K 7/10 | (2006.01) |
| G06K 7/14 | (2006.01) |
| H04L 9/08 | (2006.01) |
| H04L 9/30 | (2006.01) |
| H04L 9/32 | (2006.01) |

(52) U.S. Cl.
CPC ......... *G06F 21/33* (2013.01); *G06K 7/10722* (2013.01); *G06K 7/1413* (2013.01); *G06K 7/1417* (2013.01); *H04L 9/0869* (2013.01); *H04L 9/30* (2013.01); *H04L 9/3247* (2013.01); *H04L 9/3268* (2013.01); *H04L 2209/64* (2013.01)

(58) Field of Classification Search
CPC ...................................................... G06F 21/33
See application file for complete search history.

(56) References Cited

U.S. PATENT DOCUMENTS

| | | | |
|---|---|---|---|
| 8,473,757 B2 | 6/2013 | Gladstone et al. | |
| 9,887,992 B1 | 2/2018 | Venkat et al. | |
| 10,164,975 B1 * | 12/2018 | Son | H04L 63/0884 |
| 10,339,334 B2 * | 7/2019 | Sawant | H04N 21/25875 |
| 10,454,689 B1 * | 10/2019 | Sharifi Mehr | H04L 63/166 |
| 2002/0093573 A1 | 7/2002 | Cromer et al. | |

(Continued)

FOREIGN PATENT DOCUMENTS

| | | | |
|---|---|---|---|
| KR | 101113446 B1 | 2/2012 | |
| RU | 2015116519 A * | 12/2016 | A47J 31/3633 |

*Primary Examiner* — Bradley W Holder
(74) *Attorney, Agent, or Firm* — Procopio, Cory, Hargreaves & Savitch LLP

(57) ABSTRACT

Visually enrolling a camera using an optical code and a picture file, including: receiving the picture file and the optical code from the camera, wherein the optical code includes a public key of the camera; generating a visual challenge using a nonce created by a random number generator; transmitting the visual challenge to a user of the camera to capture the visual challenge; receiving the captured visual challenge from the camera; extracting a response from the captured visual challenge; comparing the response to the nonce to verify a signature of the captured visual challenge using the public key of the camera and to convert the optical code received from the camera into a valid certificate; and enrolling the camera and adding the valid certificate to a key store.

6 Claims, 5 Drawing Sheets

(56) References Cited

U.S. PATENT DOCUMENTS

| | | | |
|---|---|---|---|
| 2002/0191090 A1* | 12/2002 | Safai | H04N 23/631 |
| | | | 348/E9.01 |
| 2006/0036864 A1* | 2/2006 | Parulski | H04N 1/4486 |
| | | | 713/176 |
| 2007/0168674 A1* | 7/2007 | Nonaka | G07F 7/1008 |
| | | | 713/168 |
| 2011/0219427 A1 | 9/2011 | Hito | |
| 2013/0111208 A1 | 5/2013 | Sabin et al. | |
| 2014/0108810 A1 | 4/2014 | Chenna | |
| 2017/0134167 A1 | 5/2017 | Carter | |
| 2017/0317997 A1 | 11/2017 | Smith et al. | |
| 2019/0089696 A1 | 3/2019 | Kim | |

* cited by examiner

VISUAL ENROLLMENT OF CAMERAS

CROSS-REFERENCE TO RELATED APPLICATIONS

The present application is a divisional application of co-pending U.S. patent application Ser. No. 16/859,449, filed Apr. 27, 2020. The disclosure of the above-referenced application is incorporated in its entirety herein.

BACKGROUND

Field

The present disclosure relates to the enrollment of cameras, and more specifically, to the enrollment of cameras using visual challenge and response.

Background

Cameras may append cryptographic digital signatures to the captured pictures or videos. The objectives for the attachments may include the integrity of the signed information (i.e., any alteration of the picture means the signature is not verified) and the authentication of the issuer (i.e., to prove that the camera that signed the picture could have generated the signature). However, the second objective would be valid only if the entity that verifies the signature can check that the camera claiming the signature actually signed it.

In the conventional solution, the camera holds a cryptographic public-private key pair with which the camera signs the picture or video using the private key and publishes the public key. However, in this solution, the verifier still lacks proof that the claiming camera holds the private key corresponding to the public key. The current solutions for providing the proof involve a tethered challenge-response protocol. One solution involves the camera being directly connected to the verifier, for instance, via an https connection. Thus, this solution implies that the camera integrates a full communication stack for the challenge-response protocol and manages a connection profile with the verifier. However, this solution may become cumbersome if there are several verifiers or if a verifier changes its characteristics. Another solution may include connecting the camera to the verifier through a companion application. Thus, the camera may use a USB connection with the companion application acting as a proxy with the verifier. Although this solution may be less complicated, it still involves a tethered protocol.

SUMMARY

The present disclosure provides for visually enrolling a camera using an optical code and a picture file.

In one implementation, a method for visually enrolling a camera using an optical code and a picture file is disclosed. The method includes: receiving the picture file and the optical code from the camera, wherein the optical code includes a public key of the camera; generating a visual challenge using a nonce created by a random number generator; transmitting the visual challenge to a user of the camera to capture the visual challenge; receiving the captured visual challenge from the camera; extracting a response from the captured visual challenge; comparing the response to the nonce to verify a signature of the captured visual challenge using the public key of the camera; converting the optical code received from the camera into a valid certificate; and enrolling the camera and adding the valid certificate to a key store.

In one implementation, the optical code includes a QR code. In one implementation, converting the optical code into a valid certificate includes verifying that a format of the valid certificate is compliant. In one implementation, converting the optical code into a valid certificate includes verifying that a trusted certification authority signed the valid certificate. In one implementation, converting the optical code into a valid certificate comprises verifying that the public key was not revoked. In one implementation, the method further includes aborting the enrollment of the camera when the optical code does not include the valid certificate. In one implementation, the method further includes launching a timer to generate a time limit; and aborting the enrollment of the camera when the response is not received from the camera within the time limit.

In another implementation, a signing camera is disclosed. The camera includes: a capture module to capture an image and convert the image into digital information; a signing module to receive the digital information and sign the digital information using a private key of the signing camera to generate a signature, wherein the signing module combines the digital information and the signature into a picture file; and an optical code generator to generate an optical code using a device certificate and send the generated optical code to the signing module, wherein the generated optical code is added to the picture file.

In one implementation, the optical code is a QR code. In one implementation, the optical code is a bar code. In one implementation, the optical code is a machine-readable optical label. In one implementation, the device certificate includes a public key of the camera. In one implementation, the camera further includes a switch capable of being in a first position or a second position, wherein the switch in the first position enables the digital information from the capture module to pass to the signing module, and wherein the switch in the second position enables the generated optical code to pass to the signing module.

In another implementation, a system to verify a signature of a picture file received from a camera is disclosed. The system includes: a signature verifier to receive the picture file, which includes at least essence and signature, from the camera, generate a signature of the essence with a public key of the camera, verify whether the signature in the picture file corresponds to the signature of the essence, and generate a result of the verification; an optical code extractor to receive the picture file and extract an optical code including the public key of the camera; and an enrollment module to generate a nonce using a random number generator, generate a visual challenge using the nonce, and transmit the visual challenge to the camera, the enrollment module to enroll the camera when the result of the verification indicates that the signature in the picture file corresponds to the signature of the essence.

In one implementation, the optical code includes a certificate. In one implementation, the certificate is valid when a format of the certificate is compliant. In one implementation, the certificate is valid when the certificate is verified as signed by a trusted certification authority. In one implementation, the certificate is valid when the public key is verified to be not revoked. In one implementation, the system further includes a key store to store the certificate and the public key when the result of the verification indicates that the signature in the picture file corresponds to the signature of the essence. In one implementation, the system further includes a timer to generate a time limit and enable the enrollment module to abort the enrollment of the camera when the optical code is not received from the optical code extractor within the time limit.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the conventional solutions for providing the proof that the claiming camera holds the private key corresponding to the public key involves cumbersome steps of a tethered challenge-response protocol.

Certain implementations of the present disclosure provide for extracting the public key from the visual certificate, generating and sending a visual challenge to the camera, receiving and verifying a visual response to the visual challenge, and verifying the signature of the picture file carrying the visual response using the public key.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, the camera holds a private key and an associated public key. When taking a picture, the camera issues a picture file that has two elements, the essence and the signature. The essence is a digital representation of the picture and the signature is a cryptographic signature of the essence generated using the private key of the camera. On the other side, a verifier includes the means to verify the signature of the picture file for the corresponding essence with the public key of the camera.

However, for this implementation, the verifier also needs to verify that the camera possesses the actual private key corresponding to the public key. Thus, for this implementation, the camera also includes an optical code generator that turns any arbitrary text into a digital image. Further, the verifier needs to include an optical code generator and an optical code extractor that can perform the inverse operation (i.e., turn back the image generated by the optical code generator or a capture of this image into the corresponding text).

Figure 1:
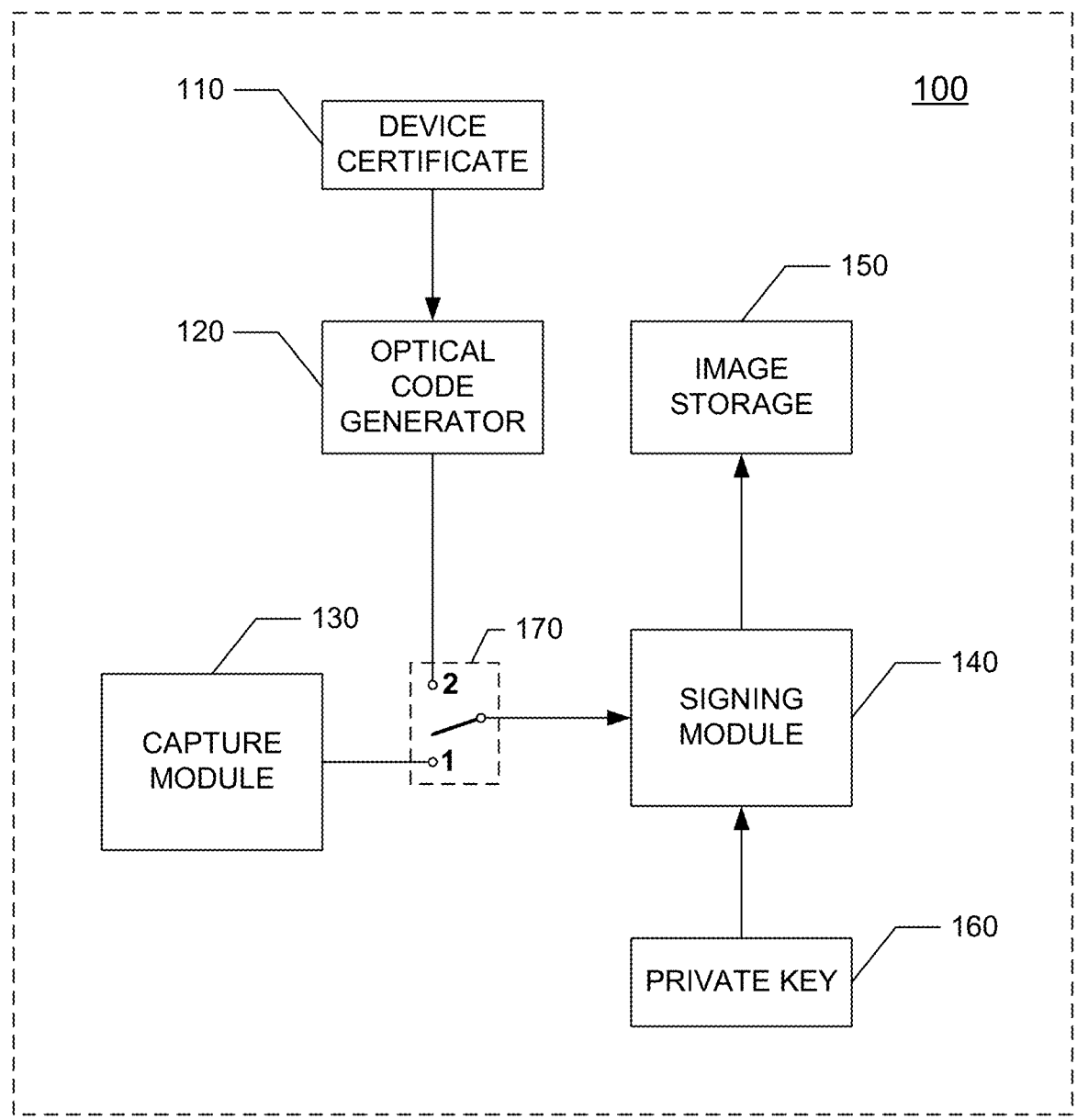
FIG. 1 is a block diagram of a signing camera in accordance with one implementation of the present disclosure.

FIG. 1 is a block diagram of a signing camera 100 in accordance with one implementation of the present disclosure. Although a camera may have many more elements than shown, only the elements relevant to the implementation of FIG. 1 are shown. In the illustrated implementation of FIG. 1, the signing camera 100 includes a private key 160, a device certificate 110, a capture module 130, a signing module 140, an optical code generator 120, an image storage unit 150, and a switch 170.

In one implementation, the optical code generator 120 is a generator that generates machine-readable optical labels, including bar codes and Quick Response (QR) codes. The device certificate 110 includes the public key corresponding to the private key 160. In one implementation, the capture module 130 includes all of the elements needed to capture an image and convert the image into digital information called the essence. In one implementation, the signing module 140 receives the essence from the capture module (when the switch 170 is in position 1) and calculates the cryptographic hash of the essence. In one particular implementation, the calculation of the hash uses SHA256. The signing module 140 signs the calculated hash using the private key 160 to generate the signature. The signing module 140 combines the essence and the signature to form a picture file which is stored in the image storage unit 150. It should be noted that it is not necessary for the signing module 140 to calculate the hash, but generate the signature directly by signing the essence.

The optical code generator 120 generates an optical code using the device certificate 110 and sends the generated optical code to the signing module 140 (when the switch 170 is in position 2). Thus, the signing module 140 also adds the optical code to the picture file when the signing module 140 receives the optical code from the optical code generator 120.

Figure 2:
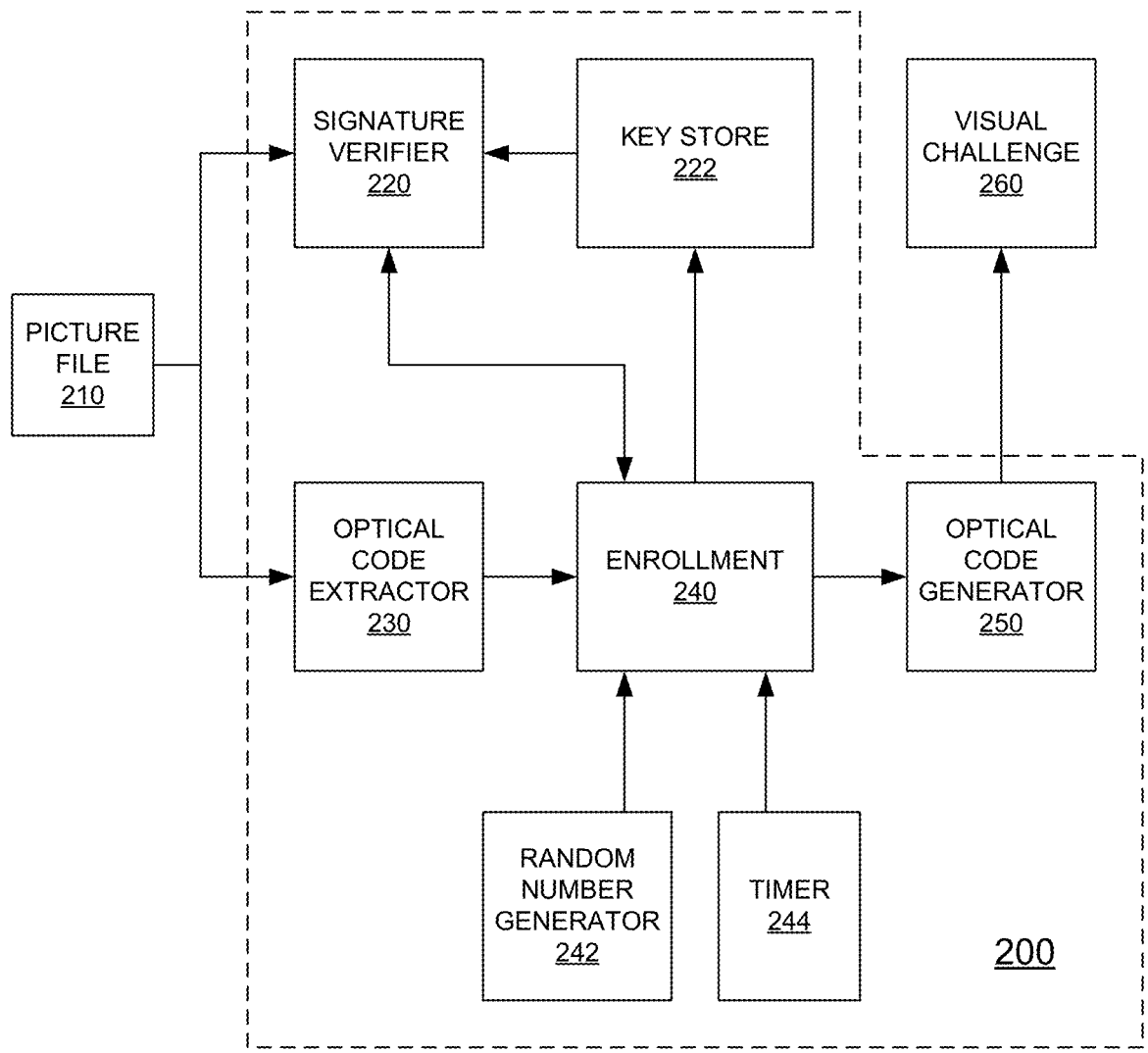
FIG. 2 is a block diagram of a verifier in accordance with one implementation of the present disclosure.

FIG. 2 is a block diagram of a verifier 200 in accordance with one implementation of the present disclosure. Although a verifier may have many more elements than shown, only the elements relevant to the implementation of FIG. 2 are shown. In the illustrated implementation of FIG. 2, the verifier 200 includes a signature verifier 220, a key store 222, an optical code extractor 230, an enrollment module 240, a random number generator 242, a timer 244, and an optical code generator 250.

In one implementation, the signature verifier 220 receives the picture file 210, which includes at least the essence and the signature, and calculates the cryptographic hash of the received essence. The signature verifier 220 verifies whether the signature corresponds to the signature of the hashed essence using the public key of the camera 100 extracted from the key store 222 or provided by the enrollment module 240. In one implementation, the key store 222 holds the certificates of all cameras that the verifier 200 enrolled successfully. Depending on the application, the signature verification may be targeted towards one specific camera, or towards some or all of enrolled cameras to determine whether any of the enrolled cameras issued the picture file 210. The signature verifier 220 then issues a result of the verification (i.e., whether the signature corresponds to the signature of the hashed essence using the public key of the camera) to the enrollment module 240.

In one implementation, the optical code extractor 230 extracts the information carried in the optical code stored in the picture file 210. In one implementation, the enrollment module 240 receives the optical code from the optical code extractor 230 and attempts to convert the received optical code into a valid certificate. In one implementation, the enrollment module 240 attempts the conversion assuming it is an X509 format encoded in the Privacy-Enhanced Mail (PEM) format. The conversion process by the enrollment module 240 attempts to verify: that the format is compliant; that a trusted Certification Authority signed the certificate; and that the public key was not revoked.

In one implementation, the verification process includes the enrollment module 240 generating a nonce from the random number generator 242 and forwarding the nonce to the optical code generator 250, which generates a visual challenge 260. In one implementation, the verifier 200 sends the visual challenge 260 as a Portable Network Graphic (PNG) file. The enrollment module 240 also launches the timer 244 and aborts the enrollment process if an optical code is not received from the optical code extractor 230 within a set time period. In another implementation, the enrollment process also aborts if the extracted optical code is not equal to the generated nonce. In a further implementation, the enrollment module 240 queries the signature verifier 220 to determine whether the picture file 210 (that carries the nonce) can be verified with the public key that was carried by the first optical code.

The enrollment module 240 aborts the enrollment process if the signature verifier 220 returns an indication that the signature in the picture file does not correspond to the signature of the hashed essence using the public key of the camera. Otherwise, if the signature verifier 220 returns an indication that the signature in the picture file does correspond to the signature of the hashed essence, the enrollment module adds the certificate carried by the first optical code to the key store 222. The optical code generator 250 generates an optical code image from the input information. In one implementation, the optical code generator 250 displays and/or prints the text in a given font, and the optical code extractor 230 is an optical character recognition module.

In one implementation, the overall enrollment process includes following steps: (1) the owner of the signing camera 100 requests a visual certificate; (2) the signing camera 100 feeds the device certificate 110 to the optical code generator 120 which generates the corresponding essence; (3) the signing module 140 signs the essence and stores the corresponding picture file 210 in the image storage unit 150; (4) the owner of the signing camera 100 retrieves and sends the picture file to the verifier 200 to initiate the enrollment process; (5) the verifier 200 performs the necessary steps described above to produce the visual challenge 260 in a form of a generated optical code; and (6) the owner of the signing camera 100 captures and forwards the generated optical code to the verifier 200.

In another implementation, the signing camera 100 avoids the use of the optical code generator entirely by receiving the private key, the device certificate, and the already-generated visual certificate at the time of the manufacturing of the camera 100.

Figure 3:
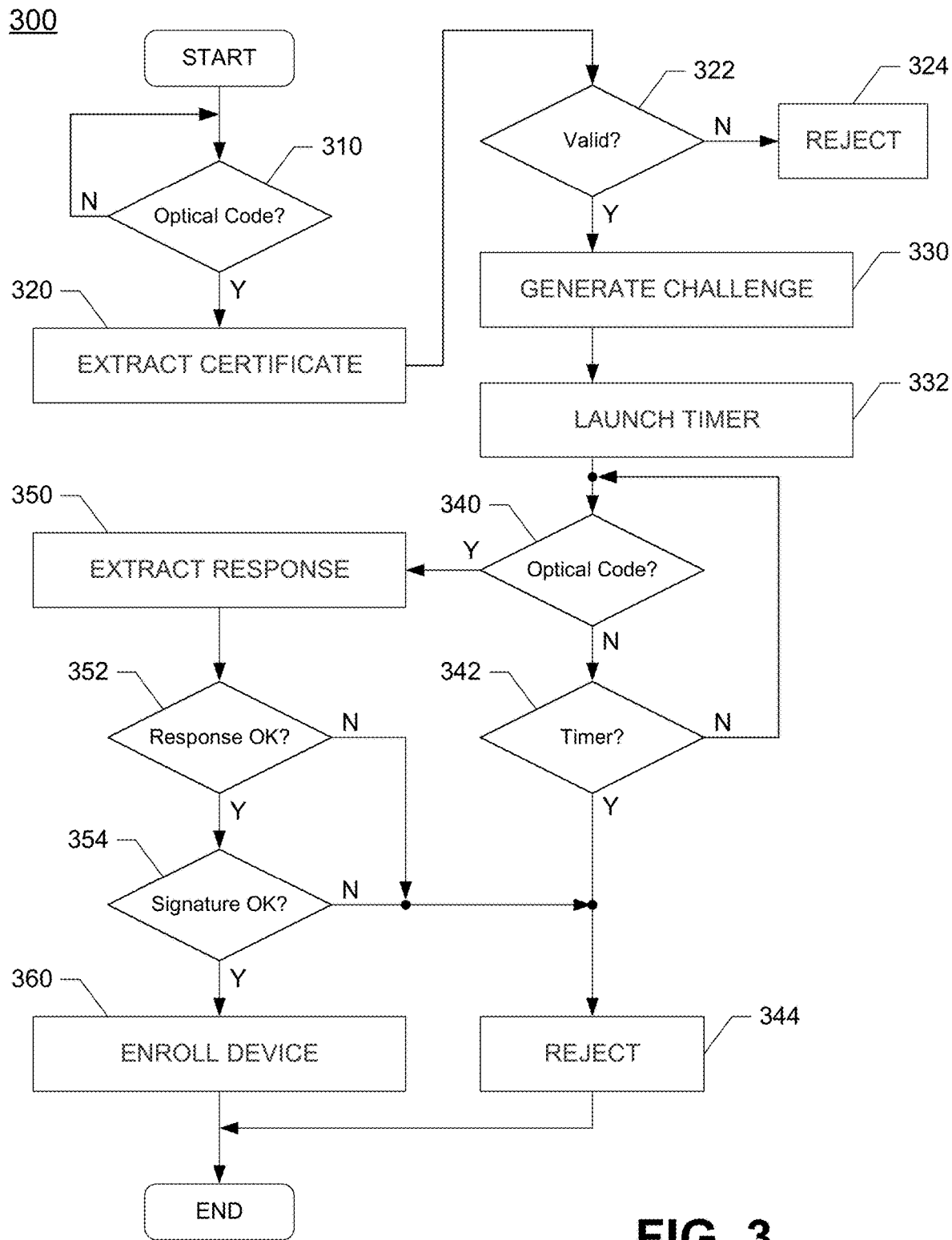
FIG. 3 is a flow diagram of a method for enrolling devices in accordance with one implementation of the present disclosure.
Figure 4:
FIG. 4 presents an example of a QR code holding a real, PEM-encoded, X509 certificate.

FIG. 3 is a flow diagram of a method 300 for enrolling devices in accordance with one implementation of the present disclosure. In the illustrated implementation of FIG. 3, the enrollment module 240 waits for the optical code (e.g., the QR code) from the optical code extractor 230, at step 310, and attempts to convert the optical code into a valid certificate, at step 320. In one implementation, the conversion assumes that the certificate is encoded in the Privacy-Enhanced Mail (PEM) format. FIG. 4 presents an example of a QR code holding a real, PEM-encoded, X509 certificate.

In one implementation, a determination is made, at step 322, whether the optical code carries a valid certificate. The validation process verifies that: (1) the format is compliant; (2) a trusted Certification Authority signed the certificate; and (3) the public key was not revoked. If it is determined, at step 322, that the optical code does not carry a valid certificate (e.g., a valid X509 certificate), then the process is aborted and the enrollment is rejected, at step 324.

Otherwise, if it is determined, at step 322, that the optical code does carry a valid certificate, then the enrollment module 240 generates a visual challenge, at step 330. In one implementation, to generate the visual challenge 260, the enrollment module 240 generates a nonce using the random number generator 242, and forwards the nonce to the optical code generator 250, which creates the visual challenge 260. In one implementation, the verifier 200 returns the visual challenge 260 as a PNG file to the requester.

In one implementation, the enrollment module then launches the timer 244, at step 332. If the enrollment module 240 does not receive an optical code from the optical code extractor 230 before the timer 244 ends, at step 342, then the process is aborted and the enrollment is rejected, at step 344. Otherwise, if the optical code is received within the time limit, at step 340, then the response (i.e., the optical code) is extracted, at step 350, and checked, at step 352, to determine whether it is equal to the nonce. If the extracted optical code is not equal to the nonce, then the process is also aborted and the enrollment is rejected, at step 344.

Otherwise, if the extracted optical code is equal to the nonce, at step 352, then the enrollment module 240 queries the signature verifier 220, at step 354, to determine whether the picture file 210 that carries the nonce can be verified with the public key that was carried by the first optical code. If the signature verifier 220 returns false, at step 354, then the process is aborted and the enrollment is rejected, at step 344. Otherwise, the enrollment module 240 enrolls device, at step 360, and adds the certificate carried by the first optical code to the key store 222.

In one implementation, the steps of FIG. 3 process the enrollment of devices sequentially (i.e., the signature verifier fails if a new enrollment request occurs before the completion of the ongoing enrollment). In another implementation, the steps can be programmed to process concurrent enrollments if the method of FIG. 3 considers all of the ongoing enrollments.

Figure 5A:
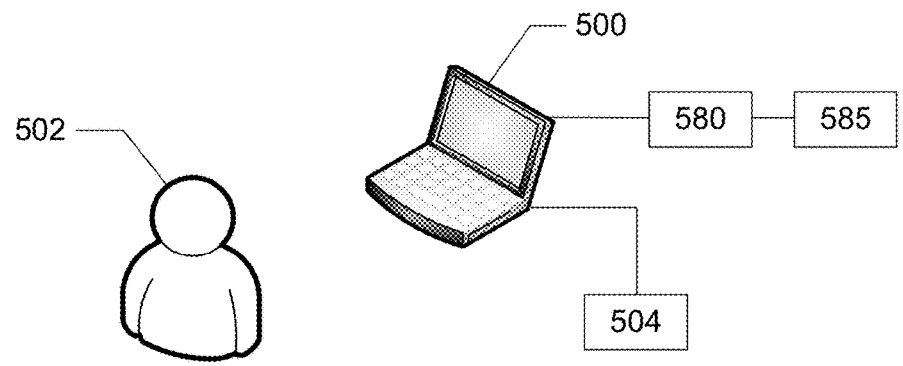
FIG. 5A is a representation of a computer system and a user in accordance with an implementation of the present disclosure.

FIG. 5A is a representation of a computer system 500 and a user 502 in accordance with an implementation of the present disclosure. The user 502 uses the computer system 500 to implement an enrollment application 590.

Figure 5B:
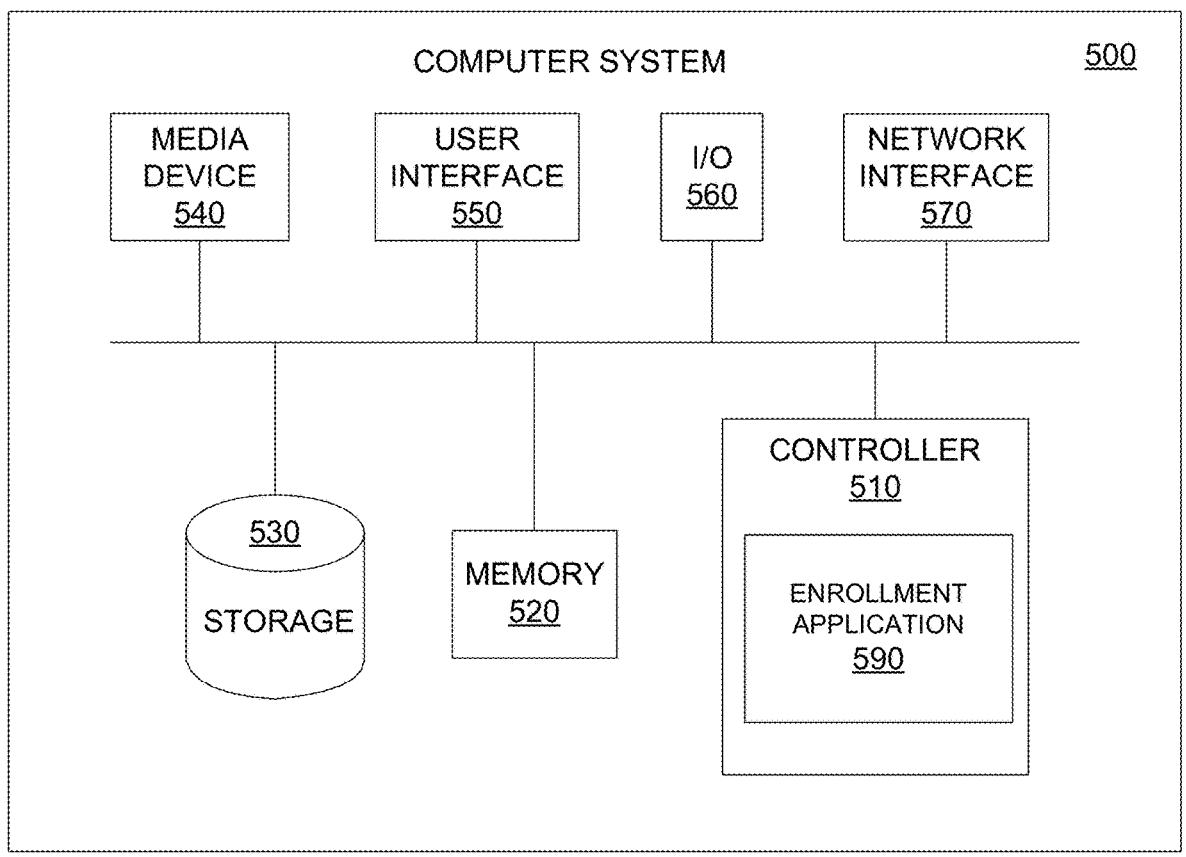
FIG. 5B is a functional block diagram illustrating the computer system hosting an enrollment application in accordance with an implementation of the present disclosure.

The computer system 500 stores and executes the enrollment application 590 of FIG. 5B. In addition, the computer system 500 may be in communication with a software program 504. Software program 504 may include the software code for the enrollment application 590. Software program 504 may be loaded on an external medium such as a CD, DVD, or a storage drive, as will be explained further below.

Furthermore, computer system 500 may be connected to a network 580. The network 580 can be connected in various different architectures, for example, client-server architecture, a Peer-to-Peer network architecture, or other type of architectures. For example, network 580 can be in communication with a server 585 that coordinates engines and data used within the enrollment application 590. Also, the network can be different types of networks. For example, the network 580 can be the Internet, a Local Area Network or any variations of Local Area Network, a Wide Area Network, a Metropolitan Area Network, an Intranet or Extranet, or a wireless network.

FIG. 5B is a functional block diagram illustrating the computer system 500 (e.g., a mobile device such as a laptop computer) hosting the enrollment application 590 in accordance with an implementation of the present disclosure. A controller 510 is a programmable processor and controls the operation of the computer system 500 and its components. The controller 510 loads instructions (e.g., in the form of a computer program) from the memory 520 or an embedded controller memory (not shown) and executes these instructions to control the system. In its execution, the controller 510 provides the enrollment application 590 with a software system, such as to enable the creation and configuration of engines and data extractors within the enrollment application 590. Alternatively, this service can be implemented as separate hardware components in the controller 510 or the computer system 500.

Memory 520 stores data temporarily for use by the other components of the computer system 500. In one implementation, memory 520 is implemented as RAM. In one implementation, memory 520 also includes long-term or permanent memory, such as flash memory and/or ROM.

Storage 530 stores data either temporarily or for long periods of time for use by the other components of the computer system 500. For example, storage 530 stores data used by the enrollment application 590. In one implementation, storage 530 is a hard disk drive.

The media device 540 receives removable media and reads and/or writes data to the inserted media. In one implementation, for example, the media device 540 is an optical disc drive.

The user interface 550 includes components for accepting user input from the user of the computer system 500 and presenting information to the user 502. In one implementation, the user interface 550 includes a keyboard, a mouse, audio speakers, and a display. The controller 510 uses input from the user 502 to adjust the operation of the computer system 500.

The I/O interface 560 includes one or more I/O ports to connect to corresponding I/O devices, such as external storage or supplemental devices (e.g., a printer or a PDA). In one implementation, the ports of the I/O interface 560 include ports such as: USB ports, PCMCIA ports, serial ports, and/or parallel ports. In another implementation, the I/O interface 560 includes a wireless interface for communication with external devices wirelessly.

The network interface 570 includes a wired and/or wireless network connection, such as an RJ-45 or "Wi-Fi" interface (including, but not limited to 802.11) supporting an Ethernet connection.

The computer system 500 includes additional hardware and software typical of computer systems (e.g., power, cooling, operating system), though these components are not specifically shown in FIG. 5B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A signing camera having a public key and a private key, the signing camera comprising:
at least one or more hardware processors;
capture module logic, operating on the at least one or more hardware processor, to capture an image and convert the image into digital information,
wherein the image is a visual challenge, received from a verifier, in the form of an encoded optical code using a nonce created by a pseudo random number generator;
signing module logic, operating on the at least one or more hardware processor, to receive the digital information, and sign the digital information using the private key of the signing camera to generate a signature,
wherein the signature is a cryptographic signature of the image,
wherein the signing module logic combines the digital information and the signature into a picture file; and
optical code generator logic, operating on the at least one or more hardware processor, to generate an optical code from a text using a device certificate and send the generated optical code to the signing module logic,
wherein the signing module logic adds the generated optical code to the picture file,
wherein the signing module logic sends the picture file to the verifier as a visual response to the visual challenge.

2. The signing camera of claim 1, wherein the optical code is a QR code.

3. The signing camera of claim 1, wherein the optical code is a bar code.

4. The signing camera of claim 1, wherein the optical code is a machine-readable optical label.

5. The signing camera of claim 1, wherein the device certificate includes a public key of the camera.

6. The signing camera of claim 1, further comprising
a switch capable of being in a first position or a second position, wherein the switch in the first position enables the digital information from the capture module logic to pass to the signing module logic, and wherein the switch in the second position enables the generated optical code to pass to the signing module logic.

* * * * *